United States Patent
Wei et al.

(10) Patent No.: US 9,017,454 B2
(45) Date of Patent: Apr. 28, 2015

(54) METHOD FOR REMOVING SOX FROM GAS USING POLYETHYLENE GLYCOL

(75) Inventors: Xionghui Wei, Beijing (CN); Fang Han, Inner Mongolia (CN); Jianbin Zhang, Beijing (CN); Pengyan Zhang, Beijing (CN); Daolong Gao, Jiangxi Province (CN); Jinfei Wang, Beijing (CN); Chuan Zou, Beijing (CN); Chun Hu, Beijing (CN)

(73) Assignees: Beijing Boyuan-Hengsheng High-Technology Co., Ltd., Beijing (CN); Yongfeng Boyuan Industry Co. Ltd., Yongfeng, Jiangxi Province (CN); Peking University, Beijing (CN)

( * ) Notice: Subject to any disclaimer, the term of this patent is extended or adjusted under 35 U.S.C. 154(b) by 75 days.

(21) Appl. No.: 13/201,521

(22) PCT Filed: Feb. 10, 2010

(86) PCT No.: PCT/CN2010/070622
§ 371 (c)(1),
(2), (4) Date: Sep. 13, 2011

(87) PCT Pub. No.: WO2010/091638
PCT Pub. Date: Aug. 19, 2010

(65) Prior Publication Data
US 2011/0315014 A1 Dec. 29, 2011

(30) Foreign Application Priority Data
Feb. 16, 2009 (CN) .......................... 2009 1 0009058

(51) Int. Cl.
*B01D 53/14* (2006.01)
*B01D 53/50* (2006.01)
(Continued)

(52) U.S. Cl.
CPC .......... *B01D 53/507* (2013.01); *B01D 53/1425* (2013.01); *B01D 53/1481* (2013.01);
(Continued)

(58) Field of Classification Search
USPC .................. 95/235, 181, 92, 94; 252/60, 184
See application file for complete search history.

(56) References Cited

U.S. PATENT DOCUMENTS 4,053,575 A * 10/1977 Haas et al. ..................... 423/575
4,162,145 A * 7/1979 Alleman .......................... 95/174
(Continued)

FOREIGN PATENT DOCUMENTS

CN 1087110 A 5/1994
CN 1133817 A 10/1996
(Continued)

OTHER PUBLICATIONS

Machine Translation of CN 101053746.*
(Continued)

*Primary Examiner* — Duane Smith
*Assistant Examiner* — Cabrena Holecek
(74) *Attorney, Agent, or Firm* — Fish & Richardson P.C.

(57) ABSTRACT

A method for removing $SO_x$ (x=2 and/or 3) from gas using a solution having polyethylene glycol as the main ingredient. First, $SO_x$ in the gas is absorbed by the solution of polyethylene glycol. Second, the solution of polyethylene glycol which has absorbed $SO_x$ is regenerated by one or more of the heating, vacuum, ultrasonic, microwave or radiation methods, thereby releasing the by-products of sulfur dioxide and sulfur trioxide. The regenerated solution of polyethylene glycol is recycled. When the water content of the regenerated solution of polyethylene glycol is high enough to affect the desulfurization, it needs to be removed. Removal methods include heating and rectification, absorption using a water absorbent, or a combination of these methods. The polyethylene glycol solution is recycled after dehydration.

20 Claims, 5 Drawing Sheets

(51) Int. Cl.
*C01B 17/60* (2006.01)
*C01B 17/90* (2006.01)

(52) U.S. Cl.
CPC ..... *B01D2252/2026* (2013.01); *B01D 2252/40* (2013.01); *B01D 2257/302* (2013.01); *B01D 2258/02* (2013.01); *B01D 2258/0283* (2013.01); *C01B 17/60* (2013.01); *C01B 17/90* (2013.01)

(56) References Cited

U.S. PATENT DOCUMENTS

| | | | | |
|---|---|---|---|---|
| 4,240,923 | A | * 12/1980 | Sartori et al. | 252/189 |
| 4,406,867 | A | * 9/1983 | Marcinkowsky et al. | 423/226 |
| 4,414,004 | A | 11/1983 | Wagner et al. | |
| 5,705,090 | A | * 1/1998 | Garland et al. | 252/184 |
| 2006/0156923 | A1 | 7/2006 | Meckl et al. | |

FOREIGN PATENT DOCUMENTS

| | | | |
|---|---|---|---|
| CN | 101053746 | * 10/2007 | B01D 53/50 |
| CN | 101053746 A | 10/2007 | |
| CN | 101204639 A | 6/2008 | |
| CN | 101502741 A | 12/2009 | |
| WO | 2007077323 A1 | 12/2007 | |

OTHER PUBLICATIONS

Wei et al., Density, Viscosity, and Excess Properties for Aqueous Poly(ethylene glycol) Solutions from (298.15 to 323.15) K, Oct. 22, 2008, Journal of Chemical & Engineering Data, 53 (11), 2598-2601.*

Zhang et al., Hydrogen Bonding and Interaction in the Absorption Processes of Sulfur Dioxide in Ethylene Glycol + Water Binary Desulfurization System, Dec. 29, 2008, Ind. Eng. Chem. Res., vol. 48, No. 3, 1287-1291.*

Guo et al., Spectral Investigation of Intermolecular Hydrogen Bonding and S . . . -O Interaction in Diethylene Glycol + H2O + SO2 Systems, Dec. 15, 2010, Ind. Eng. Chem. Res., vol. 50, No. 2, 674-679.*

Shi, Yajun et al., Removal of Sulfides from Claus Tail Gas by Liquid-phase Catalytic Reaction (PEG-400 Method), Chemical World, No. 2; pp. 35-36 (1980).

* cited by examiner

METHOD FOR REMOVING SOX FROM GAS USING POLYETHYLENE GLYCOL

CROSS REFERENCE TO PRIOR APPLICATIONS

This is a U.S. National Phase application under 35 U.S.C. §371 of International Patent Application No. PCT/CN2010/070622, filed Feb. 2, 2010, and claims the priority of Chinese Patent Application No. 200910009058.1, filed Feb. 16, 2009, both of which are incorporated by reference herein. The International Application published in Chinese on Aug. 19, 2010 as WO 2010/091638 under PCT Article 21(2).

TECHNICAL FIELD

The present invention relates to a purification method of removing SOx from flue gas, SOx-containing exhaust gases and/or industrial raw material gases, that is, a method of removing SOx (x=2 and/or 3) from flue gas, SOx-containing exhaust gases and/or industrial raw material gases.

BACKGROUND ART

With the rapid development of various industries, the consumption and discharge of flue gas, sulfur-containing industrial raw material gases and other types of exhaust gases are increasing. The discharge of sulfur-containing exhaust gases has resulted in severe environmental problems such as the formation of acid rain, corrosion of buildings by acidification, and respiratory and skin diseases, which being endangering human health. Over the years, a considerable amount of research into the desulfurization of flue gas, sulfur-containing industrial raw material gases and other types of exhaust gases have been made by scientists from around the world, and huge amounts of research data have been accumulated. With the rising awareness about environmental protection, the desulfurization of flue gas, sulfur-containing industrial raw material gases and other types of exhaust gases is being taken more seriously. Nevertheless, a breakthrough in desulfurization technology for flue gas, sulfur-containing industrial raw material gases and other types of exhaust gases has not been made so far, and the desulfurization of flue gas, sulfur-containing industrial raw material gases and other types of exhaust gases remains a challenging problem.

The current desulfurization processes can generally be classified into two main groups, namely wet processes and dry processes. Wet processes include water scrubbing, limestone and lime water process, alkali metal solution process, alkaline solution process, ammonia process, hydramine process, etc. In dry processes, SOx is removed using iron oxide, zinc oxide, manganese oxide, cobalt oxide, chromium oxide, molybdenum oxide, activated carbon, etc. In China, the most common methods are water scrubbing, limestone and lime water process, whereas developed countries prefer limestone and lime water process, alkali metal solution process, alkaline solution process, ammonia process, hydramine process, etc. In water scrubbing, a large amount of water must be consumed, and the used sulfur-containing water, which cannot be recycled, causes severe secondary pollution. Moreover, only a poor desulfurization effect can be achieved by the method of water scrubbing. Limestone and lime water process is superior to water scrubbing but is disadvantageous in that it generates a large quantity of solid waste such as calcium sulfate, calcium sulfite and calcium carbonate, consumes a large amount of limestone and calcium oxide, operates on huge equipment where blockages are apt to occur due to the formation of precipitates accompanying the absorption procedure, and requires massive investment. Besides, because of the low solubility of limestone or calcium hydroxide in water, calcium hydroxide reacts first with carbon dioxide rather than with sulfur oxides during absorption, and consequently, limestone and lime water process cannot achieve an ideal desulfurization effect and causes severe secondary pollution due to a large amount of sewage. Alkali metal solution process, alkaline solution process, ammonia process, hydramine process and the like are generally applicable to the desulfurization of, and recovery of sulfur dioxide from, flue gas with a high sulfur dioxide content, such as exhaust gas from smelting industry like steelmaking and copper smelting, in which sulfur dioxide is contained in an amount up to 8% or more. These methods, however, are technologically demanding, consume considerable energy, and require that the equipment be made of high-quality materials, so they are not suitable for the desulfurization of ordinary flue gas. Furthermore, all the processes currently used for the desulfurization of flue gas, sulfur-containing industrial raw material gases and other types of exhaust gases cause serious corrosion of the equipment.

Till now, few of the various industrial waste gases are subjected to desulfurization treatment before being discharged into the atmosphere. Even if they are desulfurized, the amount of sulfur species remaining in the discharged gases is still relatively high. Most of the current desulfurization processes (including wet processes such as HiPure process, Benfield process, G-V process, A.D.A process, water scrubbing, limestone and lime water process, alkali metal solution process, alkaline solution process, ammonia process, hydramine process, tannin extract method, sulfolane process; and dry processes such as those using iron oxide, zinc oxide, manganese oxide, cobalt oxide, chromium oxide, molybdenum oxide and activated carbon) generally serve as primary desulfurization processes to eliminate hydrogen sulfide in industrial raw material gas and are not employed to remove H2S in ordinary gas because they only achieve low desulfurization efficiency, operate at high operational costs, need massive investment for equipment, cause serious corrosion, are not ideal in desulfurization effect and cannot remove organic sulfur species in high efficiency [1-3]. Low-temperature methanol desulfurization [4] is commonly used in large chemical industry enterprises for the removal of carbon and sulfur species from raw material gas. In this method, hydrogen sulfide, carbonyl sulfide, carbon disulfide and carbon dioxide are removed by physical adsorption. However, low-temperature methanol desulfurization must work at high pressure, low temperature (as low as −10° C. or less) because of the low boiling point, volatility and high saturated vapor pressure of methanol, and thus is disadvantageous in that it consumes considerable energy, causes severe loss of methanol, is complicated in operation, and operates at high costs. In normal-temperature methanol desulfurization [5], a mixed solution of methanol (60%) and diethanolamine (40%) is used to absorb hydrogen sulfide, carbonyl sulfide, carbon disulfide and carbon dioxide from gases, and then the absorbates are released by heating and depressurizing. Because of the low boiling point, volatility and high saturated vapor pressure of methanol, a large quantity of methanol are contained in the released gas, and meanwhile the solution does not have a stable composition as a result of the serious loss of methanol. Diethanolamine is apt to oxidize and decompose when exposed to light and air, which is another cause of the instability of the solution. As a result of the above limitations, the solution is regenerated only by being heated under reduced pressure. The released sulfur-containing gas is generally converted into sulfur by the Claus method. In addition to the severe loss of methanol and diethanolamine, normal-temperature methanol desulfurization is also disadvantageous in that it consumes considerable energy, is complicated in operation, and operates at high costs. The methods discussed above are not used to get rid of $SO_2$ and/or $SO_3$ from gases but to remove hydrogen sulfide and organic sulfur species such as carbonyl sulfide and carbon disulfide.

Someone tried to use an aqueous solution of urotropine containing glycerin to absorb $SO_2$ from flue gas [6]. But it was found in the actual experiment that the solution was not chemically stable due to the oxidization of urotropine by oxygen contained in the flue gas. Moreover, urotropine is a costly chemical and medical product that is not easily available. This technique has not been popularized for its high operational costs and low reliability in desulfurization effect.

A buffer of acetic acid and ammonia containing $Fe^{2+}$ and $Fe^{3+}$ has found application in the desulfurization of semi-water gas[7-9]. This technique is characterized by high desulfurization efficiency and low level of corrosion, but is unsatisfactory for instability of the buffer resulting from ion and salt effects. The process of catalytic decarbonization, desulfurization and decyanation of gases by means of iron-alkali solution is a wet desulfurization process capable of removing several sulfur species simultaneously, and it can achieve better effects than conventional wet desulfurization processes when used in the desulfurization of gases with low sulfur content. However, iron ions are instable in the alkali solution so as to create a large quantity of ferric hydroxide or ferrous hydroxide. Moreover, when the iron-alkali solution comes into contact with the sulfide-containing gas, a large amount of iron sulfide or ferrous sulfide is precipitated from the solution, causing a sharp decrease in the amount of iron ions in the solution, a decrease in desulfurization effect and blocking of the desulfurization tower. Thus, the iron-alkali solution process is not applicable to the desulfurization of gases with high sulfur content[10]. To improve the situation, the inventor attempted atmospheric/pressured desulfurization using an iron-alkali solution containing microorganisms and obtained good results[11]. There have been methods for the removal of hydrogen sulfide by a solution of ethylene glycol, an ethylene glycol ester, or diethylene glycol monomethyl ether. In these methods, the organic solution containing hydrogen sulfide is easily regenerated for recycle by adding thereto sulfur dioxide whereby hydrogen sulfide reacts with sulfur dioxide to produce sulfur[12-14]. These methods, however, operate at high costs under stringent safety measures because sulfur dioxide is not easily available and requires special instruments and safety measures in its transportation. To absorb hydrogen sulfide, organic sulfur species and water in natural gas or other gases, some researchers used a solution of ethylene glycol, a mixed solution of ethylene glycol and alkanolamine, a mixed solution of ethylene glycol, alkanolamine and sodium carbonate, a solution of ethylene glycol dimethyl ether or diethylene glycol dimethyl ether, a mixed aqueous solution of diethylamine, diethylene glycol, triethylene glycol and triethylene glycol monomethyl ether, a mixed solution of amine and acetaldehyde, or a mixed aqueous solution of diethylene glycol monomethyl ether and Fe(III) chelate of nitrilotriacetic acid[15-23]. The current processes discussed above are not applicable to the removal of SOx (sulfur dioxide and/or sulfur trioxide) from flue gas and other exhaust gases but are widely used for the removal of hydrogen sulfide, carbonyl sulfide and carbon disulfide from industrial raw material gas.

REFERENCES

[1] Benson, H. E., Parrish, R. W., HiPure Process Removes $CO_2/H_2S$, *Hydrocarbon Processing*, April, 1974, p. 81-82.

[2] Jenett, E., Giammarco-Vetrocoke Process, *The Oil and Gas Journal*, Apr. 30, 1962, p. 72-79.

[3] F. C. Riesenfeld, A. L. Kohl, translated by Shen Yusheng, *Gas Purification*, Beijing, China Building Industry Press, 1982.

[4] Dai Wenbin, Tang Hongqing, *Computer and Applied Chemistry*, 1994, 11(1), p. 44-51

[5] Ma Bin, *Coal Chemical Industry*, 1994, issue 68, p. 35-38.

[6] Zh. Prikl. Khim.(S.-Peterburg), 1993, 66(10), p. 2383-2385 (Russian).

[7] Wei Xionghui, Dai Qianyuan, Chen Zhongming, Shao Kesheng, Zhang Chending, The Principle of Desulfurization of Gases with Buffering Solution of Basic Ironic Salts, *Journal of Chemical Industry and Engineering*, 1998, 49(1), p. 48-58.

[8] Wei Xionghui, Novel Process for Desulfurization and Deoxidation of Semi-water Gas, Chinese patent application publication No. CN1087110, 1994.

[9] Wei Xionghui, Pressurized Decarbonization and Desulfurization with Iron-Alkali Solution, Chinese patent application publication No. CN1133817, 1996.

[10] Wei Xionghui, Zou Meihua, Wei Fenghui, Gas Decarbonization, Desulfurization and Decyanation Technology by Fe-Alkali Solution Catalytic Method, Chinese patent No. ZL99100596.1, 1999.

[11] Wei Xionghui, Biochemical Iron-Alkali Solution Catalytic Process for Desulfurization of Gas, Chinese patent No. ZL02130605.2, 2002.

[12] Galeeva R. G., Kamalov Kh. S., Aminov M. Kh., Gafiatullin R. R., Mitina A. P., Bakhshijan D. Ts., Safin G.R., Levanov V. V., Installation for Complete purification of Petroleum and Natural Gases, RU2070423C1.

[13] Biedermann, Jean-Michel, Process for Eliminating Hydrogen Sulphide Contained in Gas Mixture, PCT/FR83/00174.

[14] Biedermann, Jean-Michel, etc., Process for Eliminating Hydrogen Sulphide Contained in Gas Mixture, FR2532190-A1.

[15] Muraoka Hiromasa, Dehydration Method Using Glycol, JP62-95118A.

[16] Method of Dehydration Using Glycol, a German patent with the publication number of DE2333708A1

[17] A patent of the former Soviet Union with the publication number of SU1611411A1.

[18] Komuro Takeo, JP6-228573A.

[19] A patent of the former Soviet Union with the publication number of SU655410A.

[20] Wyschofsky Michael, Hoberg Dirk, Method for the Separation of Gaseous Components from Technical Gases by Means of Ethylene Glycol Dimethyl Ethers at Low Temperatures, WO03011432A1(PCT/EP02/07915)

[21] A patent of the former Soviet Union with the publication number of SU927282B.

[22] Dillon Edward Thomas, Composition and Method for Sweetening Hydrocarbons, WO9007467A1 (PCT/US89/05742).

[23] Zaida Diaz, Process for the Removal of $H_2S$ and $CO_2$ from Gaseous Streams, U.S. Pat. No. 4,368,178.

DISCLOSURE OF THE INVENTION

The present invention is intended to provide a method of absorbing SOx (x=2 and/or 3) from gases by means of a polyethylene glycol (PEG) solution (hereinafter abbrefromted as "PEG desulfurization method").

The PEG solution used in the present invention has PEG as the main ingredient. The PEG is a PEG with the degree of polymerization (DP) of 2 or more, or a mixture liquid of PEGs with different DPs. The molecular formulae of PEGs with different DPs are shown as below:

HO—C$_2$H$_4$—O—C$_2$H$_4$—OH with DP of 2;
HO—C$_2$H$_4$—O—C$_2$H$_4$—O—C$_2$H$_4$—OH with DP of 3;
HO—C$_2$H$_4$—O—C$_2$H$_4$—O—C$_2$H$_4$—O—C$_2$H$_4$—OH with DP of 4;
HO—C$_2$H$_4$—O—C$_2$H$_4$—O—C$_2$H$_4$—O—C$_2$H$_4$—O—C$_2$H$_4$—OH with DP of 5, and so on.

In the PEG desulfurization method according to the present invention, a PEG solution is used to absorb SOx (x=2 and/or 3) from a gas, and then the PEG solution having absorbed SOx therein is regenerated for recycle by one or more of heating, vacuumizing, ultrasonic processing, microwave processing and irradiation. When the regenerated PEG solution contains so much water that the desired desulfurization effect cannot be acquired, water in this PEG solution is removed by either or both of rectification and absorption from the solution to be recycled.

There is no special requirement for the total content of SOx in the gas to be desulfurized by the PEG desulfurization method according to the present invention. It is preferred, however, that the total content of SOx in the gas is less than 99.9% by volume so as to obtain a better desulfurization effect.

In the PEG desulfurization method according to the present invention, there is no strict limitation on the condition of the process in which the absorption of SOx is carried out, but it is preferred that it is carried out under atmospheric or high pressure at a temperature of −20-200° C.; the PEG solution having absorbed SOx therein is regenerated by one or more of heating, vacuumizing, ultrasonic processing, microwave processing and irradiation at a temperature of preferably 0-300° C.

The PEG solution used in the present invention is a PEG-containing liquid composed of 80.00% by mass or more of a PEG and less than 20.00% by mass of water.

In the PEG desulfurization method according to the present invention, when the PEG solution having absorbed SOx therein is regenerated by one or more of heating, vacuumizing, ultrasonic processing, microwave processing and irradiation, the byproduct is sulfur dioxide and/or sulfur trioxide.

Now the basic principle of desulfurization by means of PEG will be explained.

To illustrate the principle in a clear way, PEG with a DP of 2 is taken as an example. It is to be understood that a PEG solution used in the present invention is not limited to a solution of PEG with a DP of 2 and the principle should not be interpreted as a limitation to the following claims.

When flue gas or another SOx-containing gas comes into contact with PEG solution, following reactions take place:

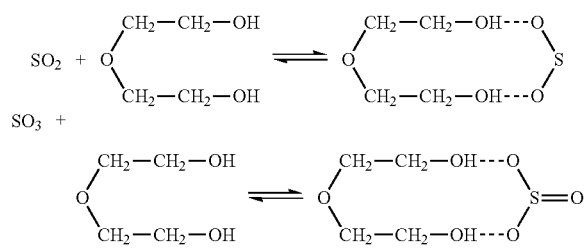

Having absorbed SO$_2$ and SO$_3$, the PEG solution becomes a S-rich solution, and it is discharged from the bottom of the desulfurization tower and fed into a regenerator wherein it is regenerated by one of more of heating, vacuumizing, ultrasonic processing, microwave processing and irradiation and releases high purity sulfur dioxide and/or sulfur trioxide. In the regenerator for the S-rich solution, following reactions take place:

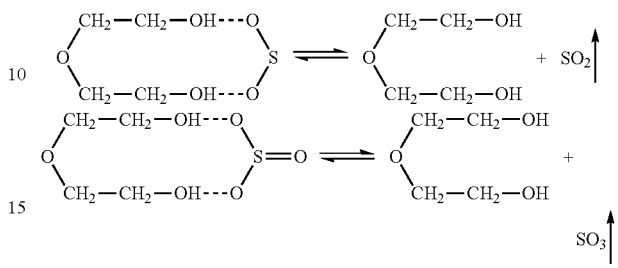

It is found through experiments that water in a PEG solution used in the present invention adversely affects the ability of the PEG solution to absorb SOx. Thus, water should be removed from the PEG solution as much as possible, that is, the PEG solution should contain as little water as possible. In practice, however, it is impossible to completely remove the water in the PEG solution. To make the PEG solution absorb SOx effectively without unduly increasing dehydration costs, it is acceptable that water is removed to such an extent that the dehydrated PEG solution contains 20% by mass or less of water.

The regenerated PEG solution (hereinafter referred to as "desulfurized solution") can be recycled.

To implement the above principle, two stages are designed: desulfurization absorption; regeneration of the desulfurized solution by one or more of heating, vacuumizing, ultrasonic processing, microwave processing and irradiation.

The first stage, i.e. desulfurization absorption may be conducted under atmospheric or high pressure. FIG. 1 is a flow chart of the absorption procedure. The desulfurization absorption takes place in the desulfurization tower. In general, a SOx-containing gas enters the desulfurization tower from its bottom, and the desulfurized solution (generally known as "S-poor solution") is fed into the desulfurization tower from its top, so they come into contact with each other in a countercurrent manner. Having had SOx absorbed by the desulfurized solution, the gas goes out of the desulfurization tower from its top, and the desulfurized solution having absorbed SOx therein turns into a S-rich solution and goes out of the desulfurization tower from its bottom to enter the regeneration stage. To complete the absorption, both the SOx-containing gas and the desulfurized solution may enter the desulrufization tower from its top and come into contact with each other in a cocurrent manner.

In the second stage, the desulfurized solution is regenerated by one or more of heating, vacuumizing, ultrasonic processing, microwave processing and irradiation.

FIG. 2 is a schematic diagram of regeneration by heating. As shown in FIG. 2, the desulfurized solution having absorbed SOx therein, i.e. the S-rich solution, is fed into the thermal regenerator wherein it releases SO$_2$ and/or SO$_3$ by heating. The regenerated desulfurized solution, generally called "S-poor solution" or "semi-S-poor solution", can be directly fed into the desulfurization tower for use in absorption, or further regenerated in another way before entry into the desulfurization tower.

FIG. 3 is a schematic diagram of regeneration by vacuumizing. As shown in FIG. 3, the desulfurized solution having absorbed SOx therein, i.e. the S-rich solution, is fed into the vacuum regenerator wherein it releases $SO_2$ and/or $SO_3$ by vacuumizing. The regenerated desulfurized solution, generally called "S-poor solution" or "semi-S-poor solution", can be directly fed into the desulfurization tower for use in absorption, or further regenerated in another way before entry into the desulfurization tower.

FIG. 4 is a schematic diagram of regeneration by ultrasonic processing, microwave processing or irradiation. As shown in FIG. 4, the desulfurized solution having absorbed SOx therein, i.e. the S-rich solution, is fed into the ultrasonic, microwave or irradiation regenerator wherein it releases $SO_2$ and/or $SO_3$ by being subjected to ultrasonic processing, microwave processing or irradiation. The regenerated desulfurized solution, generally called "S-poor solution" or "semi-S-poor solution", can be directly fed into the desulfurization tower for use in absorption, or further regenerated in another way before entry into the desulfurization tower.

Two or more of heating, vacuumizing, ultrasonic processing, microwave processing and irradiation can be used jointly in one regenerator.

Water must be removed from the regenerated PEG solution by rectification method and absorption method using a water-absorbent when its water content is high enough to deteriorate the desulfurization effect. Either of the two dehydration methods can be used alone or in conjunction with another. The dehydrated PEG solution can be recycled.

The present invention is superior to conventional wet desulfurization processes such as calcium process and ammonia process in the following aspects. (1) The conventional wet sulfurization processes are applicable only to low-sulfur content gases. The PEG desulfurization method according to the present invention is applicable not only to low-sulfur content gases but also to high-sulfur content gases. (2) Insoluble calcium salts or ammonium salts are generated during the procedures of absorption and regeneration when the conventional wet sulfurization processes are employed, causing the blocking of piping and equipment. The PEG desulfurization method according to the present invention almost does not lead to the formation of calcium salts or ammonium salts. (3) In contrast to calcium sulfate and calcium sulfite, or ammonium sulfate and ammonium sulfite, the byproducts of the conventional wet desulfurization processes when used in the desulfurization of flue gas, high purity liquid sulfur dioxide and/or sulfur trioxide is/are produced as the byproduct(s) of the PEG desulfurization method according to the present invention, which is/are commercially significant raw material(s) for the chemical industry. Besides, the PEG desulfurization method according to the present invention is such a highly effective purification method that gases desulfurizated by the method can reliably achieve a total sulfur content of 5 mg/m³ or less. Low operational costs, small investment, and being simple to operate and less time consuming also feature the PEG desulfurization method according to the present invention.

The PEG desulfurization method according to the present invention is applicable to the desulfurization of a variety of gases including flue gas, incineration gas, coke oven gas, synthetic waste gas from dyestuff plants, sewage gas exhausted from chemical fiber plants, Clause tail gas, and other industrial raw material gases or exhaust gases, each of which has a total sulfur content of less than 99.9% by volume.

BEST MODE FOR CARRYING OUT THE INVENTION

The PEG desulfurization method according to the present invention will be described in more detail below with reference to embodiments. The embodiments are presented for the purpose of better explaining the present invention and should not be interpreted as limitations on the following claims.

Figure 1:
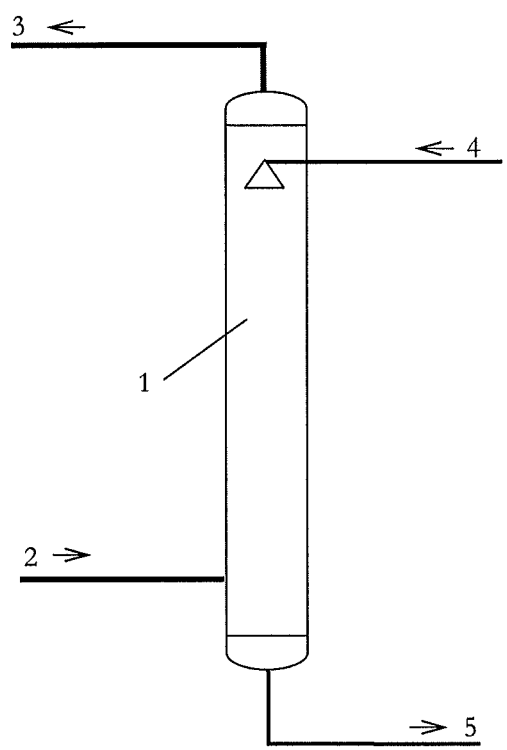
FIG. 1 is a schematic diagram of the desulfurization absorption procedure.

The first stage of the PEG desulfurization method according to the present invention is desulfurization absorption as shown in FIG. 1 wherein 1 represents a desulfurization tower, 2 represents a SOx-containing gas, 3 represents a purified gas, 4 represents a S-poor desulfurized solution, and 5 represents a S-rich desulfurized solution.

As shown in FIG. 1, the SOx-containing gas 2 is fed into the desulfurization tower 1 from its bottom, and it comes into contact with the S-poor desulfurized solution 4 in a countercurrent manner; SOx in the SOx-containing gas 2 is absorbed by the S-poor desulfurized solution 4 and turns into the purified gas 3, which leaves the desulfurization tower 1 from its top; having absorbed SOx, the S-poor desulfurized solution 4 turns into the S-rich desulfurized solution 5 and is released from the desulfurization tower 1 from its bottom. The S-rich desulfurized solution 5 enters a regeneration procedure to be regenerated by one or more of heating, vacuumizing, ultrasonic processing, microwave processing and irradiation.

By repeating the absorption procedure shown in FIG. 1, the inventors studied the absorption of sulfur dioxide in a gaseous mixture of sulfur dioxide and nitrogen by aqueous solutions of PEG (of which the DP is 8-10 and the average molecular weight is 380-420) at 298.15K and 122.61 Kpa, and got vapor-liquid equilibrium data (see Table 1 below). In the experiment, the content of sulfur dioxide in the gas phase was measured by gas chromatography, and the content of sulfur dioxide in the liquid phase was measured by iodimetry.

TABLE 1

Vapor-liquid equilibrium data for the absorption of a gaseous mixture of sulfur dioxide and nitrogen by a series of aqueous PEG solutions at 298.15K and 122.61 Kpa

| Content of PEG in solutions (% by mass) | Content of $SO_2$ in liquid phase $C_{SO2}$/mg · $L^{-1}$ | Content of $SO_2$ in gas phase $y_{SO2}$/ppmv |
|---|---|---|
| 0.00 | 61.839 | 6.40 |
| 0.00 | 70.324 | 25.62 |
| 0.00 | 77.597 | 53.76 |
| 0.00 | 84.870 | 79.09 |
| 0.00 | 94.568 | 137.14 |
| 0.00 | 115.174 | 233.53 |
| 0.00 | 152.751 | 380.83 |
| 0.00 | 175.782 | 501.69 |
| 0.00 | 200.026 | 580.35 |
| 0.00 | 219.420 | 627.46 |
| 20.01 | 131.937 | 23.90 |
| 20.01 | 134.671 | 38.23 |
| 20.01 | 153.126 | 82.83 |

TABLE 1-continued

Vapor-liquid equilibrium data for the absorption of a gaseous mixture of sulfur dioxide and nitrogen by a series of aqueous PEG solutions at 298.15K and 122.61 Kpa

| Content of PEG in solutions (% by mass) | Content of $SO_2$ in liquid phase $C_{SO2}$/mg·$L^{-1}$ | Content of $SO_2$ in gas phase $y_{SO2}$/ppmv |
|---|---|---|
| 20.01 | 162.696 | 127.92 |
| 20.01 | 170.214 | 154.18 |
| 20.01 | 172.265 | 169.93 |
| 20.01 | 186.619 | 257.68 |
| 20.01 | 209.175 | 384.47 |
| 20.01 | 221.478 | 425.27 |
| 20.01 | 237.199 | 536.06 |
| 20.01 | 245.402 | 603.17 |
| 20.01 | 252.920 | 649.11 |
| 20.01 | 263.857 | 692.23 |
| 20.01 | 294.615 | 888.75 |
| 20.01 | 318.538 | 1128.41 |
| 40.39 | 203.392 | 28.16 |
| 40.39 | 223.898 | 34.79 |
| 40.39 | 247.821 | 64.87 |
| 40.39 | 252.947 | 84.21 |
| 40.39 | 273.453 | 110.40 |
| 40.39 | 276.870 | 120.18 |
| 40.39 | 293.958 | 186.89 |
| 40.39 | 304.211 | 357.31 |
| 40.39 | 324.717 | 487.51 |
| 40.39 | 334.970 | 570.07 |
| 40.39 | 360.602 | 893.43 |
| 60.01 | 78.694 | 11.83 |
| 60.01 | 273.498 | 23.57 |
| 60.01 | 362.355 | 26.48 |
| 60.01 | 393.114 | 43.69 |
| 60.01 | 403.366 | 72.90 |
| 60.01 | 430.707 | 121.50 |
| 60.01 | 440.960 | 123.56 |
| 60.01 | 451.213 | 217.74 |
| 60.01 | 478.554 | 269.51 |
| 60.01 | 499.059 | 392.14 |
| 60.01 | 519.565 | 507.36 |
| 60.01 | 533.235 | 540.97 |
| 60.01 | 557.158 | 647.29 |
| 60.01 | 570.829 | 775.24 |
| 60.01 | 598.170 | 828.77 |
| 80.02 | 399.949 | 9.19 |
| 80.02 | 553.741 | 53.75 |
| 80.02 | 560.576 | 55.81 |
| 80.02 | 567.411 | 95.08 |
| 80.02 | 594.752 | 209.79 |
| 80.02 | 608.422 | 254.28 |
| 80.02 | 690.445 | 353.80 |
| 80.02 | 779.302 | 501.86 |
| 80.02 | 786.138 | 549.97 |
| 80.02 | 837.402 | 695.23 |
| 80.02 | 933.094 | 994.35 |
| 90.01 | 150.464 | 15.47 |
| 90.01 | 222.234 | 25.36 |
| 90.01 | 266.662 | 34.14 |
| 90.01 | 389.696 | 77.62 |
| 90.01 | 423.872 | 114.26 |
| 90.01 | 492.224 | 191.25 |
| 90.01 | 522.982 | 269.57 |
| 90.01 | 546.906 | 327.15 |
| 90.01 | 587.917 | 399.42 |
| 90.01 | 601.587 | 467.45 |
| 90.01 | 608.422 | 484.20 |
| 90.01 | 628.928 | 505.03 |
| 90.01 | 680.192 | 608.16 |
| 90.01 | 741.709 | 682.06 |
| 100.00 | 632.301 | 8.89 |
| 100.00 | 864.742 | 38.02 |
| 100.00 | 888.666 | 57.56 |
| 100.00 | 957.018 | 85.25 |
| 100.00 | 963.853 | 89.46 |
| 100.00 | 987.776 | 115.32 |
| 100.00 | 1021.952 | 174.16 |
| 100.00 | 1110.810 | 267.44 |
| 100.00 | 1227.008 | 374.56 |
| 100.00 | 1298.778 | 450.10 |
| 100.00 | 1305.613 | 462.65 |
| 100.00 | 1336.371 | 508.94 |
| 100.00 | 1531.174 | 681.05 |
| 100.00 | 1548.264 | 694.59 |
| 100.00 | 1657.626 | 815.14 |

Figure 5:
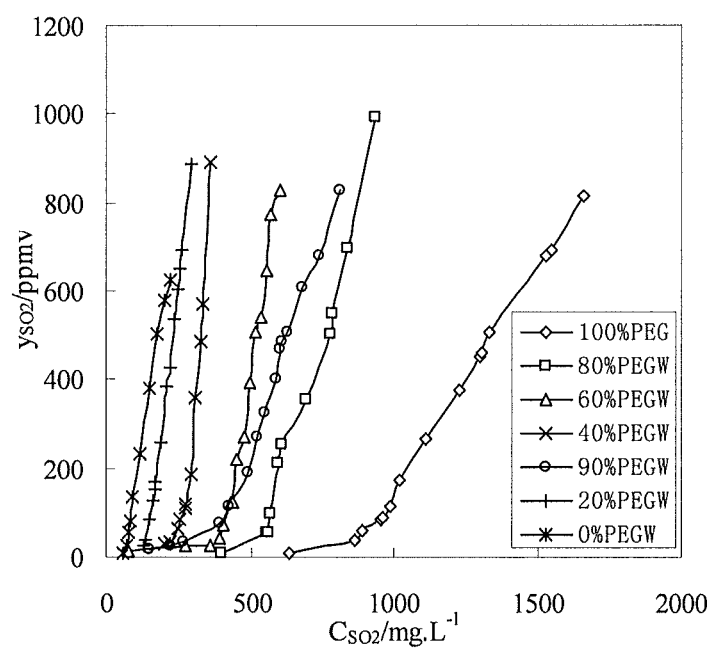
FIG. 5 shows a vapor-liquid equilibrium diagram for the absorption of a gaseous mixture of sulfur dioxide and nitrogen by a series of aqueous solutions of PEG at 298.15K and 122.61 Kpa.

FIG. 5 is a vapor-liquid equilibrium diagram plotted according to the data listed in Table 1.

It is known from results of the above experiment that when the content of water in one of the PEG solutions was higher than 20%, the ability of the PEG solution to absorb sulfur dioxide was remarkably lowered. Thus, to get a favorable desulfurization result, it is necessary to use a PEG solution containing 20% or less of water.

The second stage of the PEG desulfurization method according to the present invention is the regeneration of the desulfurized solution, in which the desulfurized solution is regenerated by one of more of heating, vacuumizing, ultrasonic processing, microwave processing and irradiation.

Figure 2:
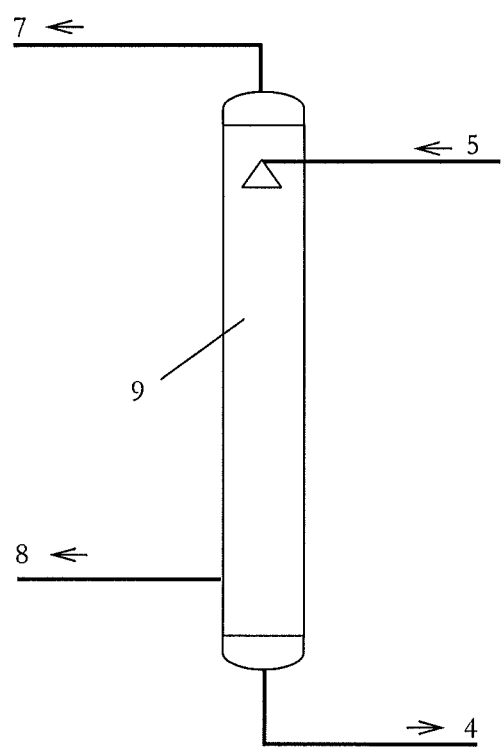
FIG. 2 is a schematic diagram of the regeneration of the desulfurized solution by means of heating.

An embodiment of regeneration by means of heating is shown in FIG. 2. In FIG. 2, 4 represents a S-poor desulfurized solution, 5 represents a S-rich desulfurized solution, 7 represents sulfur dioxide and/or sulfur trioxide, 8 represents S-containing foam and/or dust, and 9 represents a thermal regenerator.

As shown in FIG. 2, the S-rich desulfurized solution 5 is fed into the thermal regenerator 9 wherein it is heated to release the gaseous sulfur dioxide and/or sulfur trioxide 7 which can be transformed into high purity liquid sulfur dioxide and/or sulfur trioxide as the byproduct(s) of the regeneration procedure in a certain way. During the regeneration procedure, S-containing foam and/or dust 8 also come(s) into being or accumulate and depart(s) from the desulfurized solution. The S-containing foam and/or dust 8 can be further processed to become sulfur as the byproduct of the regeneration procedure. The regenerated S-rich desulfurized solution 5 turns into the S-poor desulfurized solution 4, which can be directly used in desulfurization absorption or further regenerated by one or more of vacuumizing, ultrasonic processing, microwave processing and irradiation.

Figure 3:
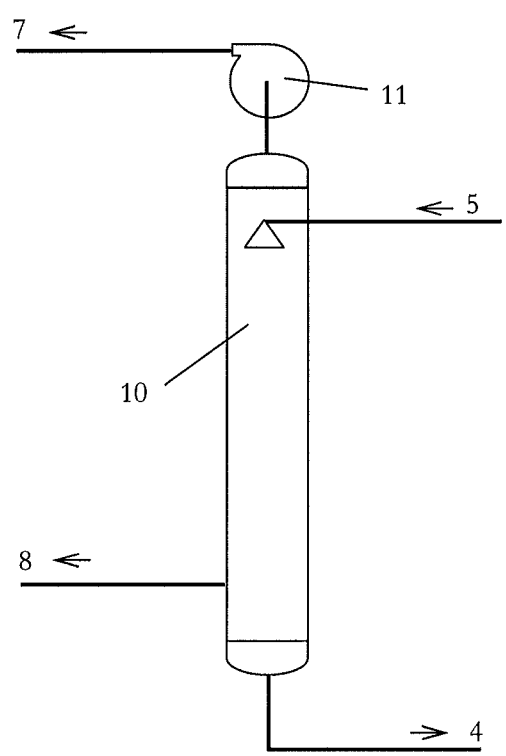
FIG. 3 is a schematic diagram of the regeneration of the desulfurized solution by means of vacuumizing.

FIG. 3 shows an embodiment of regeneration by means of vacuumizing. In FIG. 3, 4 represents a S-poor desulfurized solution, 5 represents a S-rich desulfurized solution, 7 represents sulfur dioxide and/or sulfur trioxide, 8 represents S-containing foam and/or dust, 10 represents a vacuum regenerator, and 11 represents a vacuum pump.

As shown in FIG. 3, the S-rich desulfurized solution 5 is fed into the vacuum regenerator 10 wherein the gaseous sulfur dioxide and/or sulfur trioxide 7 is/are released under reduced pressure generated by the vacuum pump 11. The gaseous sulfur dioxide and/or sulfur trioxide 7 can be transformed into high purity liquid sulfur dioxide and/or sulfur trioxide as the byproduct(s) of the regeneration procedure in a certain way. During the regeneration procedure, S-containing foam and/or dust 8 also come(s) into being or accumulate and depart(s) from the desulfurized solution. The S-containing foam and/or dust 8 can be further processed to become sulfur as the byproduct of the regeneration procedure. The regenerated S-rich desulfurized solution 5 turns into the S-poor desulfurized solution 4, which can be directly used in desulfurization absorption or further regenerated by one or more of heating, ultrasonic processing, microwave processing and irradiation.

Figure 4:
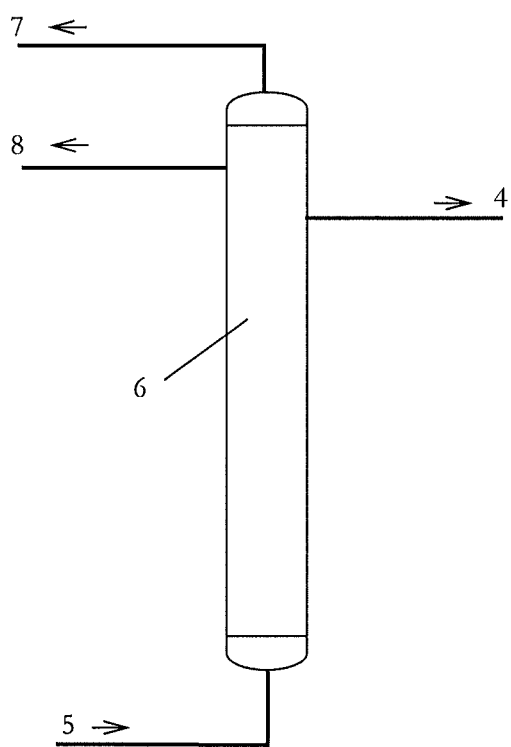
FIG. 4 is a schematic diagram of the regeneration of the desulfurized solution by means of one or more of ultrasonic processing, microwave processing and irradiation.

FIG. 4 shows an embodiment of regeneration by means of one or more of ultrasonic processing, microwave processing and irradiation. In FIG. 4, 4 represents a S-poor desulfurized solution, 5 represents a S-rich desulfurized solution, 6 represents one or more of ultrasonic, microwave and irradiation regenerator, 7 represents sulfur dioxide and/or sulfur trioxide, and 8 represents S-containing foam and/or dust.

As shown in FIG. 4, the S-rich desulfurized solution 5 is fed into one or more of ultrasonic, microwave and irradiation regenerator 6 wherein the gaseous sulfur dioxide and/or sulfur trioxide 7 is/are released by the effect of ultrasonic wave, microwave and irradiation. The gaseous sulfur dioxide and/or sulfur trioxide 7 can be transformed into high purity liquid sulfur dioxide and/or sulfur trioxide as the byproduct(s) of the regeneration procedure in a certain way. During the regeneration procedure, S-containing foam and/or dust 8 also come(s) into being or accumulate and depart(s) from the desulfurized solution. The S-containing foam and/or dust 8 can be further processed to become sulfur as the byproduct(s) of the regeneration procedure. The regenerated S-rich desulfurized solution 5 turns into the S-poor desulfurized solution 4, which can be directly used in desulfurization absorption or further regenerated by heating and/or vacummizing.

When the regenerated PEG solution contains so much water that the desired desulfurization effect cannot be obtained, it is necessary to remove water from the PEG solution in order for it to be recycled. Methods for the removal of water include rectification method and absorption method using an water-absorbent. Either of the two dehydration methods can be used alone or in conjunction with the other. Calcium oxide, anhydrous calcium sulfate, silica gel and water-absorbent resin can be used as the absorbent.

The invention claimed is:

1. A method of absorbing SOx from a gas, comprising:
contacting the gas with a polyethylene glycol solution such that the polyethylene glycol solution absorbs SOx from the gas to purify the gas, wherein x is 2 or 3, and the polyethylene glycol solution is an aqueous solution that is composed of 80.00% by mass or more of polyethylene glycol and less than 20.00% by mass of water;
regenerating the polyethylene glycol solution having absorbed SOx therein; and
recycling the regenerated polyethylene glycol solution.

2. The method of claim 1, wherein the polyethylene glycol solution absorbs SOx under atmospheric pressure at a temperature of −20-200° C. or by pressurizing at a temperature of −20-200° C.

3. The method of claim 1, wherein the gas has a total content of SOx of less than 99.9% by volume.

4. The method of claim 1, wherein the method forms a purified gas having a total sulfur content of 5 mg/m$^3$ or less.

5. The method of claim 1, the method removes SOx from at least one of SOx-containing exhaust gases and industrial raw material gases.

6. The method of claim 5, wherein the SOx-containing exhaust gases comprise flue gas.

7. The method of claim 1, wherein the method further comprises regenerating the polyethylene glycol solution having absorbed SOx therein for recycling at a temperature of 0-300° C. by one or more methods selected from the group consisting of heating, vacuumizing, and irradiation to release at least one of sulfur dioxide and sulfur trioxide to form a regenerated polyethylene glycol solution.

8. The method of claim 7, wherein the irradiation comprises ultrasonic processing or microwave processing.

9. The method of claim 7, wherein the method comprises using two or more methods selected from the group consisting of heating, vacuumizing, and irradiation jointly in one regenerator.

10. The method of claim 9, wherein the irradiation comprises ultrasonic processing or microwave processing.

11. The method of any of claims 7, 9, 8, and 10, wherein the method further comprises removing water, by at least one of a rectification method and an absorption method using one or more of water-absorbents selected from the group consisting of calcium oxide, anhydrous calcium sulfate, silica gel and water-absorbent resin, from the regenerated polyethylene glycol solution to form a dehydrated polyethylene glycol solution when the regenerated polyethylene glycol solution has a water content higher than 20% by mass; and recycling the dehydrated polyethylene glycol solution.

12. The method of claim 11, wherein the polyethylene glycol solution is composed of one or more of polyethylene glycols having a degree of polymerization of 2 or more.

13. A method of absorbing SOx from a gas, comprising:
contacting the gas with a polyethylene glycol solution such that the polyethylene glycol solution absorbs SOx from the gas to purify the gas, wherein x is 2 or 3, the polyethylene glycol solution is an aqueous solution that is composed of polyethylene glycol and water, and the polyethylene glycol is the main ingredient of the polyethylene glycol solution;
regenerating the polyethylene glycol solution having absorbed SOx therein; and
recycling the regenerated polyethylene glycol solution;
wherein the regenerated polyethylene glycol solution substantially maintains its desulfurization effect.

14. The method of claim 13, wherein the polyethylene glycol solution is composed of 80.00% by mass or more of a polyethylene glycol and less than 20.00% by mass of water.

15. The method of claim 13, wherein the polyethylene glycol solution absorbs SOx under atmospheric pressure at a temperature of −20-200° C. or by pressurizing at a temperature of −20-200° C.

16. The method of claim 13, wherein the polyethylene glycol has a molecular weight of 380-420 g/mol.

17. The method of claim 13, wherein the method further comprises regenerating the polyethylene glycol solution having absorbed SOx therein for recycling at a temperature of 0-300° C. by one or more methods selected from the group consisting of heating, vacuumizing, and irradiation to release at least one of sulfur dioxide and sulfur trioxide to form a regenerated polyethylene glycol solution.

18. The method of claim 17, wherein the method further comprises removing water, by at least one of a rectification method and/or an absorption method using one or more of water-absorbents selected from the group consisting of calcium oxide, anhydrous calcium sulfate, silica gel and water-absorbent resin, from the regenerated polyethylene glycol solution to form a dehydrated polyethylene glycol solution when the regenerated polyethylene glycol solution has a water content higher than 20% by mass; and recycling the dehydrated polyethylene glycol solution.

19. The method of claim 13, the method removes SOx from at least one of SOx-containing exhaust gases and industrial raw material gases.

20. The method of claim 19, wherein the SOx-containing exhaust gases comprise flue gas.

* * * * *